United States Patent
Furlanetto et al.

(10) Patent No.: US 7,971,450 B2
(45) Date of Patent: Jul. 5, 2011

(54) DEEP-FREEZER WITH NEURAL NETWORK

(75) Inventors: Riccardo Furlanetto, Venice (IT); Michele Toppano, Udine (IT); Daniele Mari, Trieste (IT); Fabio Sinatra, Udine (IT)

(73) Assignee: Electrolux Professional SpA, Pordenone (IT)

( * ) Notice: Subject to any disclaimer, the term of this patent is extended or adjusted under 35 U.S.C. 154(b) by 1512 days.

(21) Appl. No.: 11/376,025

(22) Filed: Mar. 15, 2006

(65) Prior Publication Data

US 2006/0218960 A1    Oct. 5, 2006

(30) Foreign Application Priority Data

Apr. 5, 2005  (IT) .................. PN2005A0020

(51) Int. Cl.
*A23G 9/00* (2006.01)
(52) U.S. Cl. .......................... 62/342; 62/125
(58) Field of Classification Search ............ 62/342, 62/125, 337
See application file for complete search history.

(56) References Cited

U.S. PATENT DOCUMENTS 5,389,764 A     2/1995   Nishii et al.
7,644,017 B2 *  1/2010   Pippia et al. ............. 705/28

FOREIGN PATENT DOCUMENTS

EP         0 928 929        7/1999

* cited by examiner

*Primary Examiner* — Melvin Jones
(74) *Attorney, Agent, or Firm* — Pearne & Gordon LLP

(57) ABSTRACT

Deep-freezing apparatus for foodstuffs comprising a deep-freezing compartment, signal display means, sensor means adapted to detect the temperature inside the foodstuffs stored in said deep-freezing compartment, processing means for the signals generated by said sensor means, wherein the apparatus further comprises a neural network adapted to receive the signals issued by a temperature sensor situated inside the foodstuff being deep-frozen and by an information on the time elapsed from the beginning of the deep-freezing process, and further adapted to provide a signal representative of the residual time needed to reach a pre-set (deep-freezing) temperature, as well as processing means adapted to receive the signal output by said neural network and provide in response an information representative of the predicted time needed for a pre-determined temperature to be reached on said first temperature sensor.

10 Claims, 5 Drawing Sheets

DEEP-FREEZER WITH NEURAL NETWORK

The present invention refers to an improved kind of apparatus for deep-freezing food products containing water, adapted to indicate in advance the time needed for the temperature at a defined location or site on or inside a given food product—as detected by an appropriate temperature sensor—to reach a pre-determined value below the freezing temperature, as well as the moment at which said temperature is reached.

Known in the art are foodstuff deep-freezing appliances—in particular for use in professional kitchens and mass-catering applications in general—which are intended or required to deep-freeze quite considerable amounts of food products in an altogether short time. In deep-freezers of this kind, the freezing temperature to be reached in such applications is generally pre-set by applicable standard regulations, but can of course be also selected in accordance to individual particular needs or requirements.

Usually, the final freezing temperature is the temperature that is detected inside or, more exactly, at the core of the food product being frozen, since one can be fully confident, actually, that when the temperature at the core of a food product has eventually reached down to a given value, the temperature at the other sites of the same product is certainly lower than or, at most, equal to the value of said core temperature.

For such core temperature to be detected, use is generally made in the art of a special needle-like stick carrying a temperature sensor at the tip thereof and connected in a manner that is generally known as such in the art to external means adapted to both process the signals issued by said sensor and display the resulting information.

When such sensor detects that the temperature it senses has eventually reached down to the desired freezing value, the related information is transmitted outside, where it is used by either an operator or automatic control and actuation means to appropriately intervene in response thereto and trigger the required operations that are in most cases aimed at discontinuing the freezing process.

No means or techniques are however known to be available at the time being, which would actually enable the moment at which the freezing process reaches its end point to be known in advance.

Such limitation is not really felt or complained about in household applications, owing to the relatively small amounts of food products that are usually deep-frozen there and, above all, the fact that such food products are anyway left in the deep-freezer without any action being actually taken by the user at the end of the freezing process.

In professional kitchens or mass-catering applications, it is on the contrary generally known that there exists a great interest in being able to know in advance the moment at which the freezing process reaches its end. It is a requirement that is basically connected to the advantage of being able to timely plan and schedule the freezing processes, and duly unload the deep-freezer for introducing new water-containing foodstuffs there for freezing at the end of each such freezing process, and being therefore able to effectively plan and organize both the personnel in charge of these operations, and the availability and capacity of the refrigeration equipment needed to store the food products from the deep-freezing process.

Up to this moment, such impossibility for the freezing time to be effectively predicted derives essentially from the fact that the water contained in water-containing food products undergoes the well-known phase transition process, changing from the liquid state to the solid or ice one, when cooled down to freezing temperatures lying well below zero degrees. During this phase transition process, the temperature of the water and ice mixture remains practically constant and this fact has hitherto prevented the time needed to reach down to a temperature value below the freezing one from being capable of being predicted and calculated.

It should at this point be duly noticed that the temperature variation process in a fresh food item stored in a refrigerating or freezing compartment, as brought about by a variation in the temperature of the same compartment, is in principle fully independent of the direction followed by said temperature variation, i.e. whether upwards or downwards.

To state it in a simpler and synthetic manner, there is no reason, actually, for believing that the laws governing the cooking process of a food item in an oven, i.e. the increase in the temperature of such food item owing to an increase in the temperature in the oven cavity, may be different from the laws governing a deep-freezing process, i.e. a decrease in the temperature inside a fresh food item as brought about by a decrease in the temperature in the storage compartment of the deep-freezer in which the fresh food item itself is contained.

In fact, what really happens in both cases is an energy transfer process of the same kind, i.e. a heat-transfer process, through a body, i.e. the fresh food item, which features a given heat-insulation coefficient that does not change whether such transfer of heat energy occurs in a way or in the opposite one, as this is the case in the symmetrical heating and freezing processes.

Based on these considerations, it might therefore be naturally thought that the methods and the means used in cooking processes to determine in advance the cooking end moment, i.e. the moment at which a pre-set cooking temperature is eventually reached, are capable of being readily transferred to freezing processes involving water-containing foodstuffs.

In this connection, the patent publications EP 0 928 929 A1 to CEPEM and U.S. Pat. No. 5,389,764 to MATSUSHITA can be cited as an example, in that both of them give quite detailed information and teachings on the application of so-called neural networks in view of providing cooking ovens that are adapted to inform in advance on the end-of-cooking moment or the time left to run to complete cooking.

However, plainly and simply transferring such teachings to a deep-freezing process is practically made impossible by the afore-cited phase transition process, in which the temperature remains at a constant value for a time that is not and cannot be known in advance. As a matter of fact, in the above-mentioned patent publications—both of them relating to a cooking process—it is assumed—and this assumption lies at the basis of the teachings set forth therein, actually—that the temperature is increasing in a continuous, albeit non-constant manner.

Therefore, the occurrence of such phase transition during a deep-freezing process, while it does on the contrary not occur at all during a cooking process, practically prevents the teachings in said patents from being also applied to deep-freezing processes involving water-containing foodstuffs, i.e. food items containing a significant percentage of water.

It would therefore be desirable, and it is actually a main object of the present invention to provide a deep-freezing apparatus of a kind provided with means that are adapted to automatically issue, during a deep-freezing process that has already been started, an information concerning the time that is still left to run before a given deep-freezing temperature is reached.

According to the present invention, these aims, along with further ones that will become apparent from the following disclosure, are reached in a deep-freezing apparatus incorporating the features as defined and recited in the appended claims.

Features and advantages of the present invention will anyway be more readily understood from the description that is given below way of non-limiting example with reference to the accompanying drawings, in which.

Figure 1:
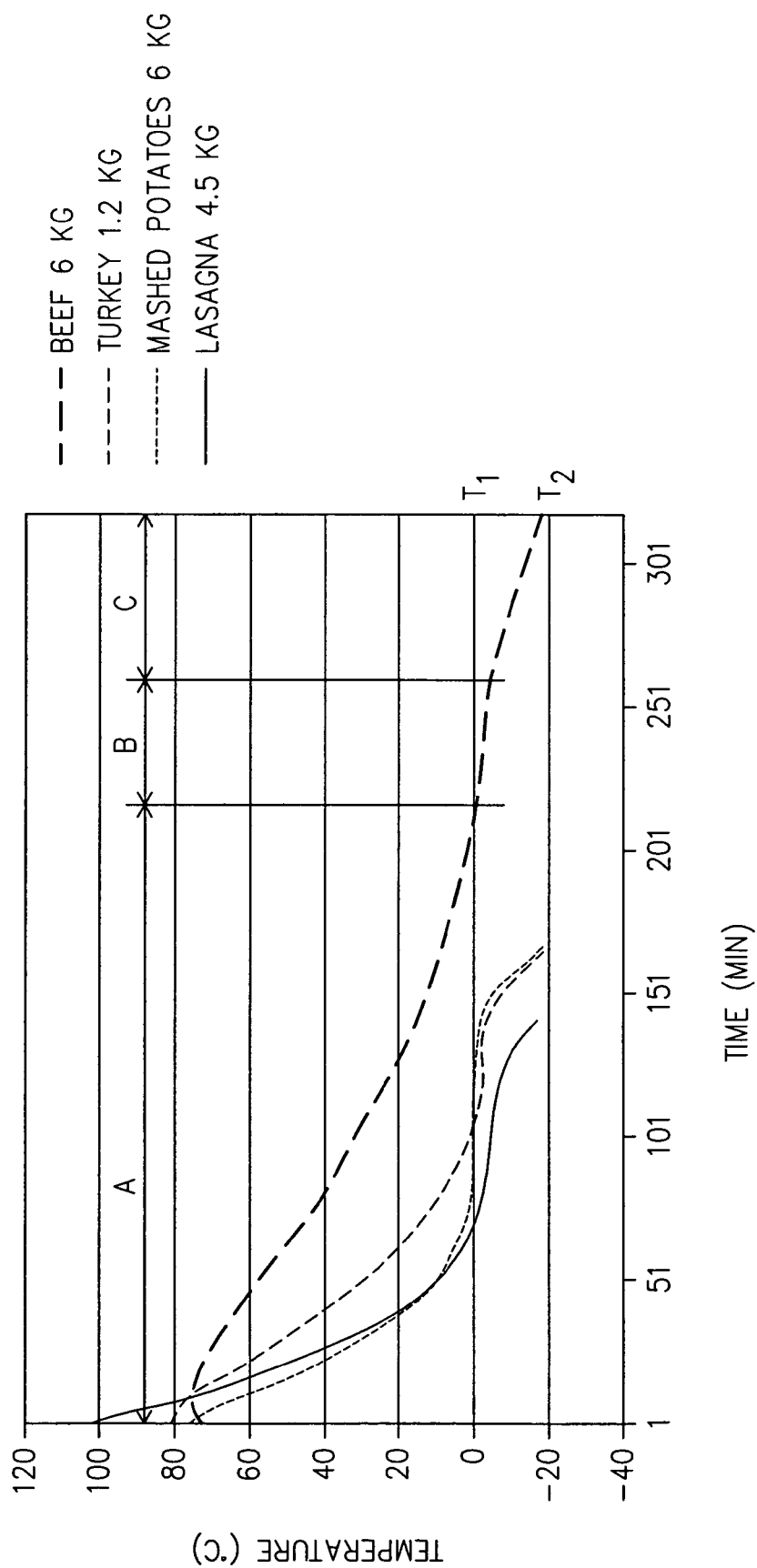
FIG. 1 is a diagram illustrating the real cooling-down and freezing curves of some food products containing water.
Figure 5:
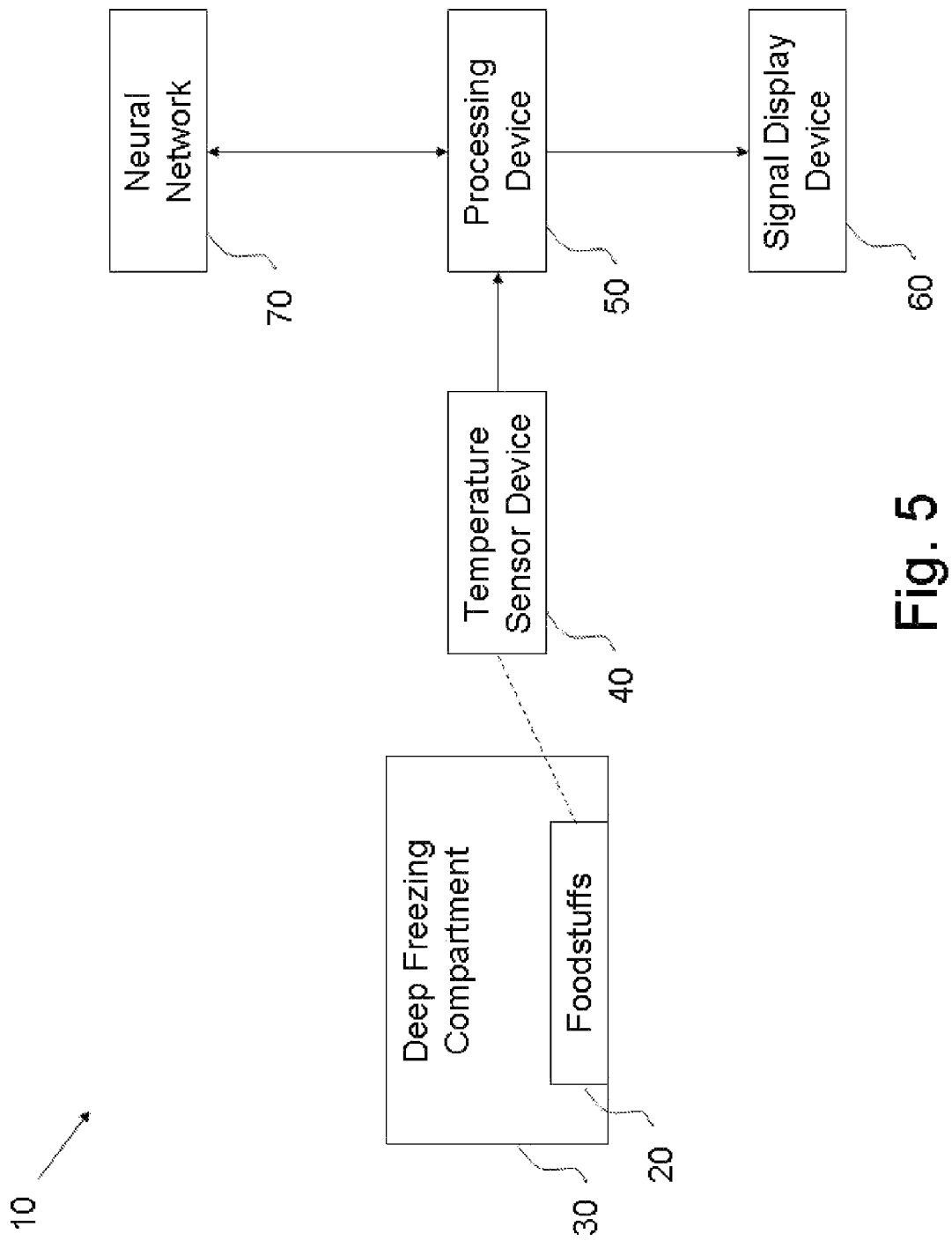
FIG. 5 is schematic illustration of a deep-freezing apparatus in accordance with the present invention.

The present invention is essentially based on following considerations and experimental findings: the curves shown in FIG. 1 represent the temperature patterns plotted versus time inside some water-containing foodstuffs 20 (FIG. 5) stored in a deep-freezing compartment 30 of a related deep-freezing apparatus 10 of a per se known type, which is held at a much lower temperature than the represented ones (not indicated in the Figure, for reasons of greater simplicity), wherein the temperatures are detected by means of a stick-like core temperature probe carrying a temperature sensor 40 on the tip, which is introduced into the mass of the foodstuff as this is generally known in the art.

It can be noticed that these curves cover a first interval A, in which they tend to gradually decrease owing to the progressive cooling-down effect inside the related foodstuffs; a second interval B, in which—upon reaching down to the freezing temperature $T_1$—they stabilize owing to the afore-cited phase transition of the water from liquid into solid or ice state occurring exactly in this time interval; and a third interval C, in which the temperature of the foodstuffs, which are definitely deep-frozen at this point, starts decreasing again, since the phase transition process is now completed, until it eventually reaches down to the final value $T_2$.

In the course of exhaustive and very accurate experiments carried out on deep-freezing processes involving deep-freezing of water-containing food products of the most varied kind in deep-freezers having different characteristics and also different steady-state temperatures prevailing in the storage compartment thereof, but lying anyway within the usual range of temperatures used to deep-freeze foodstuffs in all cases, a particular behaviour has been observed, on which the present invention has in fact based. In this connection, let us consider the total time $t_t$ required to complete deep-freezing, and the corresponding time $t_f$ (which is an initial fraction of said time $t_t$) required to proceed from the instant $T_0$, at which the cooling-down process begins, up to the instant $T_c$, at which there on the contrary begins the phase transition process of the water, i.e. the actual freezing process in the strict sense of the word.

Figure 2:
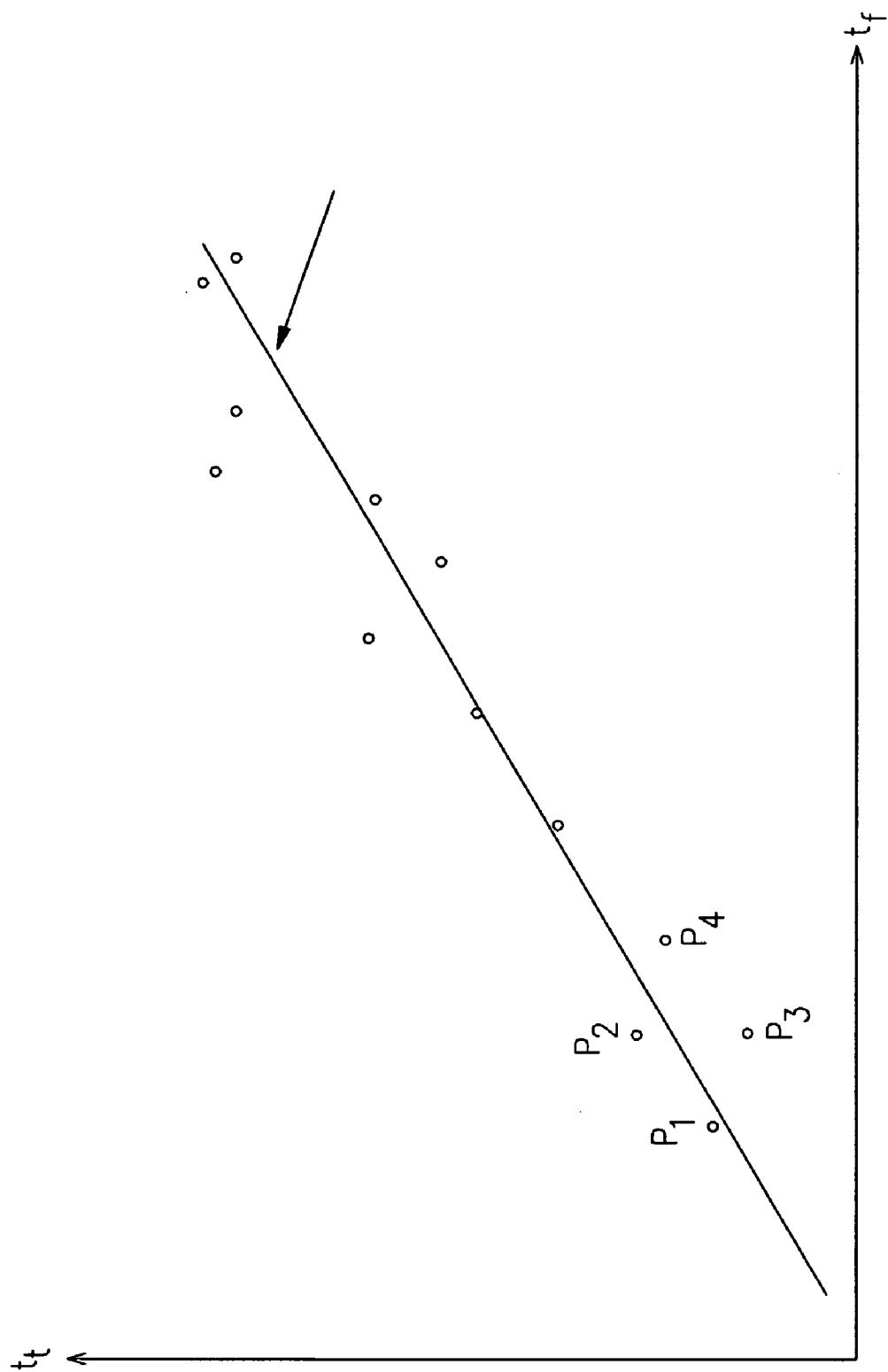
FIG. 2 is a diagram illustrating, on a Cartesian plane, the relationship existing between the total deep-freezing times and the corresponding partial times up to beginning of the phase transition of the water, as detected in a number of experiments run with different kinds of water-containing foodstuffs.

These two times $t_t$ and $t_f$ have been plotted in the abscissa and the ordinate, respectively, of a Cartesian graph shown in FIG. 2, where the intersection of the respective abscissas and ordinates generates a first point $P_1$.

This experiment is then repeated a number of times on foodstuffs that may be either of a similar or even a different kind (wherein they shall however include water-containing foodstuffs in all cases), and each such experiment most obviously generates a respective point $P_2$, $P_3$, . . . and so on, in the manner explained above.

It has been surprisingly observed at this point that said points $P_1$, $P_2$, . . . , etc. are not distributed at random in the diagram, but tend rather to distribute in a roughly aligned manner.

The possibility is in this way given to identify, through mathematical processing techniques known as such in the art, a correlation curve R that can be sensibly associated to a straight line representing in a significantly true and accurate manner the actual distribution of said points. The real purport of such finding is based on the fact that this curve represents the behaviour of all water-containing foodstuffs in general during a deep-freezing process of a conventional kind, and it does not depend on:

either the kind of foodstuff being processed, or the actual temperature prevailing in the freezing compartment (and, as a result, it does not depend on the type of freezing apparatus being used, either), or even the amount of foodstuffs that have to be deep-frozen.

In other words, it can be basically stated that the substantial proportionality existing between said times $t_t$ and $t_f$, which—as noted above—does not even depend on the kind of foodstuff being handled, is the actual fact on which the present invention is based, i.e. the fact that all possible variables, which may intervene in determining said times, act in much the same manner.

As a result, if such times are compared with each other, these variables tend to automatically compensate and annul each other and, thus, disappear, i.e. do not show up in the comparison of the above-cited times.

It can therefore be in a sufficiently accurate manner concluded that, when a water-containing foodstuff of any kind whatsoever is being deep-frozen from the fresh state thereof, the time $t_t$ needed to complete the deep-freezing process is proportional to the time $t_f$ elapsing from the instant $T_0$, i.e. the beginning of the cooling-down process, to the instant $T_c$, i.e. the beginning of the state transition phase.

Thus, such unexpected finding, relating to the behaviour of water-containing foodstuffs during deep-freezing, enables appropriate actions to be taken in view of deriving a practical advantage therefrom, as this is described in greater detail below.

Figure 3:
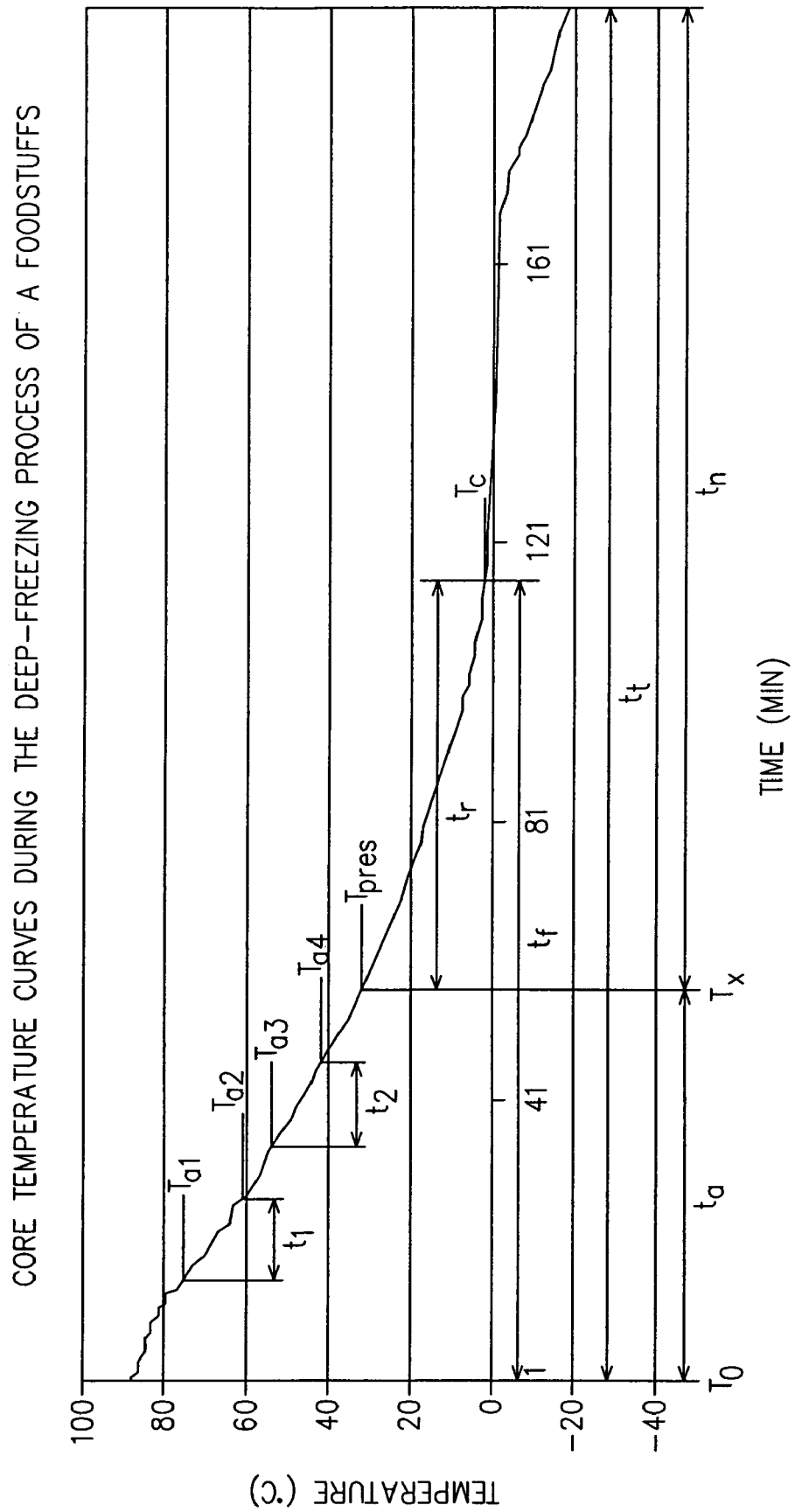
FIG. 3 is a diagram similar to the one appearing in FIG. 1, and referred to a foodstuff of a general kind, but in which there have been entered the times and the temperatures used in the following description.

With reference to FIG. 3, which again represents the temperature trend versus time inside a fresh water-containing foodstuff being deep-frozen, a measurement is made of the time $t_1$ that is needed to bring the temperature from a first pre-determined level $T_{a1}$ down to a second, again pre-determined, level $T_{a2}$.

As the foodstuff keeps being cooled down, a second measurement is made of the time $t_2$ that is needed to bring the temperature from a third pre-determined level $T_{a3}$ down to a fourth, again pre-determined, level $T_{a4}$.

Finally, the temperature $T_{pres}$ is recorded at the moment at which data processing is performed, i.e. at that general instant $T_x$ being situated after the time interval $t_a$ from said instant $T_0$.

These three data $t_1$, $t_2$ and $T_{pres}$ are input in a neural network 70 (FIG. 5), which is adapted to work out and output the residual time $t_r$, i.e. the time that has still to run until the initial freezing temperature $T_c$ is reached from the instant at which said three above-mentioned data are processed.

The possibility therefore is given for the initial time $t_f$ needed to reach said initial freezing temperature $T_c$ starting from the beginning of the deep-freezing process to be immediately and easily calculated, since such time is of course:

$$t_f = t_r + t_a \quad (1)$$

where $t_a$ is the time elapsed from the beginning of the deep-freezing process, which is of course known on an instant-by-instant basis, at each instant.

Then, from said initial time $t_f$, as this has just been calculated according to the relation (1) explained above, there is derived, with the aid of means that are generally known as such in the art, as explained hereinbelow, the total time $t_t$ to complete the deep-freezing process.

Finally, by subtracting from this total time $t_t$ to complete the deep-freezing process the actual time $t_a$ elapsed from the beginning of the deep-freezing process, the desired time-to-run value $t_n$, i.e. the time that is still needed to reach the final freezing temperature at the end of the deep-freezing process:

$$T_n = t_t - t_a \quad (2)$$

As far as the determination of said total time $t_t$ is concerned, the latter can be worked out in any of the following two preferred manners, i.e.:

According to a first method, a curve B allowing for the best possible correlation with the results of a plurality of deep-freezing experiments is calculated and in an appropriate memory there is stored the resulting formula:

$$y = (f(x))$$

which comes close to a prime polynomial in practical cases, i.e.:

$$Y = a \cdot x + b$$

Introduced in this formula is the value of x, i.e. the value of $t_f$ as calculated and defined above, thereby immediately obtaining the value of Y, i.e. the value of $t_t$.

Thus, using the preceding relation (2), the desired value of $t_n$, i.e. the actual time to run to the end of the deep-freezing process, is readily found.

According to another and, for the matter, simpler method, the values of $t_t$ and $t_f$ are tabulated and, once the value of $t_f$ is calculated as described above, the corresponding value of $t_t$ can be readily identified with a pre-determined degree of accuracy using means largely known as such in the art; then, by subtracting the time $t_a$ elapsed from the beginning $T_0$ of the cooling-down phase from said value of $t_t$, the desired value of $t_n$ is readily found.

At this point, it should most appropriately be explained— even if this is largely known to those skilled in the art, actually—that said processing performed in view of working out the time $t_n$ needed to reach the end of the deep-freezing process, can be carried out at each generic instant $T_x$ of the time interval preceding the moment at which the temperature $T_c$ is reached, since the time and temperature data to be input in the neural network can be measured and processed in such time interval.

And, most obviously, the generic instant at which such processing is performed, and which is situated at the time $t_a$ from the beginning of the cooling-down phase, must be subsequent to, i.e. must take place after said measurements.

Figure 4:
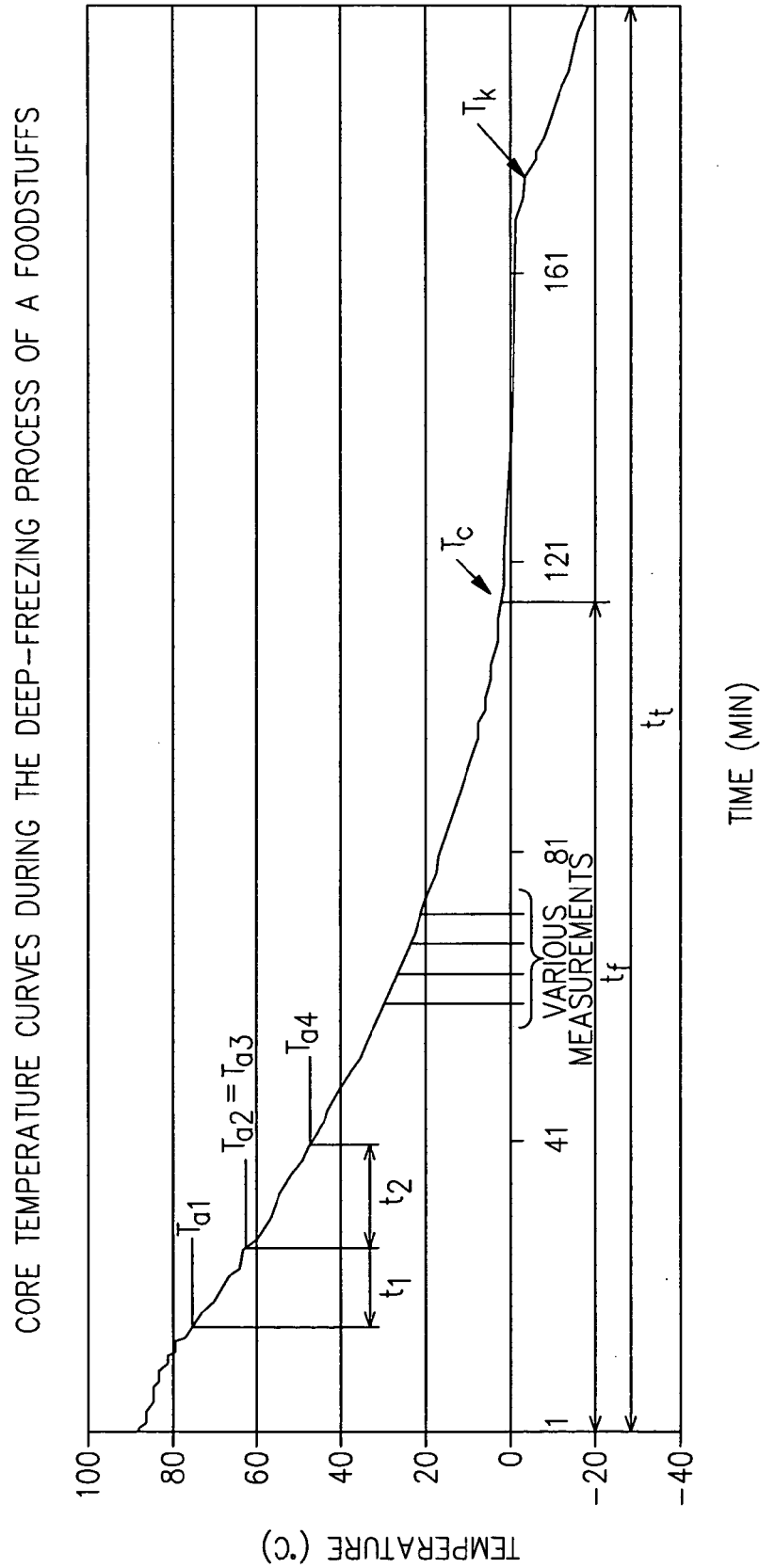
FIG. 4 is again a diagram of the kind shown in FIG. 3, in which there have been introduced different symbols relating to an improved embodiment of the present invention.

As described above, the present invention leaves room for some advantageous improvements. A first such improvement relates to the moment, as well as the frequency, at which the measurement and the calculation of the time needed to complete freezing must be performed. With reference to FIG. 4, it may be for instance decided that the instant $T_{a2}$, at which the first measurement interval of the time $t_1$ terminates, coincides with the instant $T_{a3}$, at which the second measurement interval of the time $t_2$ begins; in other words, in view of reducing the overall measurement time it may be advantageous that the two subsequent time intervals corresponding to pre-defined temperature levels being reached, as explained hereinbefore, are also contiguous to each other. This measure can be readily taken and implemented without this involving any negative implication as far as the measurements themselves and the resulting processing steps are concerned.

A second improvement arises from the possibility, and the advantage, for the measurement of the time $t_n$, which is still needed to complete the deep-freezing process, to be performed not only once at said instant $T_x$, but a plurality of times within the time interval corresponding to the temperature interval $T_0$-$T_c$; such possibility quite obviously arises from the fact that what has been set forth above applies to a generic measurement instant, i.e. to each single generic instant and, therefore, also to a plurality of generic instants following each other in time.

Therefore, by sequentially ensuring in this way a continuously updated measurement of the time $t_n$, the advantage is obtained that the prediction provided each time by the system becomes increasingly accurate, and this owing to both the error margin of the neural network shrinking gradually as the temperature $T_c$, i.e. the temperature at which the state transition phase begins, is approached (until this margin fully disappears when such temperature is eventually reached), and the known time component, i.e. the elapsed the time $t_a$, gradually increases relative to the total time $t_t$.

As a result, the control means of the deep-freezing apparatus 10 (FIG. 5) can be easily and advantageously set and programmed—using means and methods that are largely known as such in the art—to perform a plurality of successive measurements and associated processing steps, as well as to provide—on a real-time basis—successive indications of the respective residual times $t_n$ that are still needed to complete the deep- freezing process.

As far as the neural network 70 itself is concerned, use can be made of a single neural network, which must however have been previously "instructed" with a plurality of appropriate computation algorithms, wherein each such algorithm will have been determined in relation to definite temperature levels, at which the respective instants are measured, and, therefore, to definite time intervals as required by the neural network 70 itself.

It will be readily apparent at this point that all it takes is to have a definite number of measurement instants and corresponding preceding measurements intervals programmed in the neural network along with respective algorithms, in order to be able to perform the required time and temperature ($T_{pres}$) measurements relating to a plurality of respective generic instants $T_x$, and input the resulting measurement data in a respective neural network corresponding to those intervals and that particular measurement instant, so as to obtain the desired succession of times-to-run $t_n$.

A further advantageous improvement can be obtained if the fact is duly considered that, upon completion of the state transition phase, i.e. from the instant $T_k$ on, the decrease in the temperature of the foodstuff goes on in a continuous and predictable manner, since it is no longer conditioned by the discontinuity introduced by the state transition phase.

Now, use can be advantageously made of such circumstance by providing further measurement, processing means 50 and indicator or display means 60 that, starting exactly from the above-cited instant $T_k$, will automatically and periodically generate—and display outside—information concerning the residual time left to run until the end of the deep-freezing process.

Such predicted time, which will of course replace the time predicted according to the afore-described methods, can be processed and worked out with such means and methods as generally known as such in the art. So, for instance, use can again be made in this connection of an appropriately instructed neural network; alternatively, use can be made on a computational method based on the interpolation—either linear or not, based on the actual temperature (i.e. the temperature existing at the moment of measurement)—and the successive derivatives thereof.

Since these methods are largely known to all those skilled in the art, and their application to the circumstances being discussed here does not imply any particular difficulty or inventive effort, their implementation shall not be described here any further for reasons of brevity and greater simplicity.

No particular reference has intentionally been made throughout this description to any particular kind of deep-freezing apparatus, nor any particular indication has intentionally been given throughout this description as far as the type of deep-freezing apparatus itself is concerned, since this of no relevance to the purposes of the present invention, as well as because the present invention generally applies to any kind and type of deep-freezing apparatus that is adapted to deep-freeze water-containing foodstuffs, actually.

Moreover, the techniques used not only to provide, but also to "instruct" neural networks, along with all related means of an electronic type for storing, processing and displaying information and data, as well as for detecting electric signals that are representative of given temperatures, are generally known as such in the art and easily implemented by those skilled in the art upon completing the required experiments and defining the required values in accordance with the above teachings.

The invention claimed is:

1. Deep-freezing apparatus for foodstuffs comprising:
   a deep-freezing compartment,
   a sensor device adapted to detect a temperature inside the foodstuffs stored in said deep-freezing compartment,
   a processing device for signals generated by said sensor device,
   a display device for displaying information worked out and output by said processing device,
   a neural network adapted to receive the signals issued by said processing device for the signals from said temperature sensor device,
   and by a plurality of information pieces on a duration of successive time intervals, each one of which measures the time elapsing for going from a respective first temperature down to a respective second temperature, and is adapted to provide information relating to an estimated time ($t_r$) that is still needed for the temperature inside the foodstuff being deep-frozen to reach down to a pre-set, still lower temperature value ($T_c$), at which there corresponds the state transition phase of the same foodstuff,
   and in that said processing device is adapted to receive said time information ($t_r$) from said neural network and provide in response thereto an information representative to the predicted time ($t_n$) needed for a pre-determined temperature lying below said state transition temperature ($T_c$), and measurable by said sensor device, to be eventually reached.

2. Deep-freezing apparatus according to claim 1, wherein said pre-determined temperature is a deep-freezing temperature lying significantly below 0° C.

3. Deep-freezing apparatus according to claim 2, wherein, at a pre-determined processing instant ($T_x$), said processing device is adapted to:
   determine the time ($t_1$) elapsed for the temperature detected by said sensor device to decrease from a first temperature value ($T_{a1}$) to a second temperature value ($T_{a2}$) lying below said first temperature value ($T_{a1}$), and
   the time ($t_2$) elapsed for the temperature detected by said sensor device to decrease from a third temperature value ($T_{a3}$) to a fourth temperature value ($T_{a4}$) lying below said third temperature value ($T_{a3}$),
   input said times ($t_1$) and ($t_2$), as well as the actual temperature value ($T_{pres}$) measured by the sensor at the moment of said processing step, in said neural network, which is in turn adapted to determine the residual time ($t_r$) still needed for the temperature to reach down to a pre-set value ($T_c$),
   calculate the initial time ($t_f$) as the sum of the time ($t_a$) elapsed up to the measurement instant and the corresponding residual time ($t_r$),
   process said initial time ($t_f$) by comparing it with previously stored information adapted to provide the duration of the total time ($t_t$) of the deep-freezing process based on said initial time ($t_f$).

4. Deep-freezing apparatus according to claim 3, wherein said processing device is adapted to subtract from said total time ($t_t$) the time ($t_a$) elapsed from the beginning of the cooling-down process, and to output the so generated time information ($t_n$) to external the display device.

5. Deep-freezing apparatus according to claim 4, wherein said first processing device, said neural network and said second processing device are programmed and adapted to perform the operations specified in the preceding claims 3 and 4 in a repetitive manner at pre-fixed intervals.

6. Deep-freezing apparatus according to claim 5, wherein said second temperature ($T_{a2}$) coincides with said third temperature ($T_{a3}$).

7. Deep-freezing apparatus according to claim 1, wherein said temperature at a pre-set value ($T_c$) is the temperature lying close to the point at which the foodstuff starts to be deep-frozen.

8. Deep-freezing apparatus according to claim 1, wherein said previously stored information is
   a linear relation adapted to correlate said total time ($t_t$) based on said duration of the initial time ($t_f$) of the deep-freezing process or, alternatively,
   a numeric table, in which a plurality of values of said initial time ($t_f$) correspond to a plurality of values of said total time ($t_t$) of the entire cooling-down and deep-freezing process.

9. Deep-freezing apparatus according to claim 1, wherein the neural network is adapted to provide, upon completion of the state transition phase ($T_k$), a predictive information on the time needed to reach the end of the deep-freezing process.

10. Deep-freezing apparatus according to claim 9, wherein said predictive time-to-run information automatically and periodically replaces any other information that may have been previously supplied concerning said time needed to reach the end of the deep-freezing process.

* * * * *